(12) United States Patent
Patel et al.

(10) Patent No.: US 9,603,223 B2
(45) Date of Patent: Mar. 21, 2017

(54) ILLUMINATION CONTROLLER

(71) Applicant: PHILIPS LIGHTING HOLDING B.V., Eindhoven (NL)

(72) Inventors: Maulin Dahyabhai Patel, Tuckahoe, NY (US); Ruben Rajagopalan, Neuss (DE); Harry Broers, 'S-Hertogenbosch (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 14/912,128

(22) PCT Filed: Aug. 8, 2014

(86) PCT No.: PCT/IB2014/063800
§ 371 (c)(1),
(2) Date: Feb. 15, 2016

(87) PCT Pub. No.: WO2015/022611
PCT Pub. Date: Feb. 19, 2015

(65) Prior Publication Data
US 2016/0205744 A1 Jul. 14, 2016

Related U.S. Application Data

(60) Provisional application No. 61/988,334, filed on May 5, 2014.

(30) Foreign Application Priority Data

Aug. 15, 2013 (EP) ..................... 13180551

(51) Int. Cl.
*H05B 37/02* (2006.01)
*E06B 9/32* (2006.01)
(Continued)

(52) U.S. Cl.
CPC .......... *H05B 37/0218* (2013.01); *E06B 9/24* (2013.01); *E06B 9/32* (2013.01); *G01J 1/4204* (2013.01);
(Continued)

(58) Field of Classification Search
CPC ... H05B 37/0218; H05B 37/0227; E06B 9/24; E06B 9/32; E06B 2009/6818;
(Continued)

(56) References Cited

U.S. PATENT DOCUMENTS 4,273,999 A * 6/1981 Pierpoint ................. G01J 1/42
250/205
6,448,802 B1 * 9/2002 Hirt ...................... G01R 31/311
324/762.03
(Continued)

FOREIGN PATENT DOCUMENTS

CN 201448737 U 5/2010
WO 2010116283 A2 10/2010
(Continued)

OTHER PUBLICATIONS

Lalonde, Jean-Francois, et al., "Estimating Natural Illumination From a Single Outdoor Image," http://graphics.cs.cmu.edu/projects/outdoorillumination, May 2013 (8 Pages).

*Primary Examiner* — Vibol Tan
(74) *Attorney, Agent, or Firm* — Meenakshy Chakravorty (57) ABSTRACT

An illumination controller is provided. The illumination controller comprises a light sensor device having a first light sensor arrangement configured to sense light within a first spectral range including non-visible light and excluding a sub-range constituted by at least a major part of the visible light, and a second light sensor arrangement configured to sense light within a second spectral range including at least a part of said sub-range. Furthermore, the illumination
(Continued)

controller comprises a control unit connected with the light sensor device and arranged to determine an amount of daylight on the basis of an output signal of the first light sensor arrangement and a predetermined function, which characterizes the relationship between the spectral power distribution of the infrared spectrum of daylight and the spectral power distribution of the visible spectrum of daylight, and to determine an amount of artificial light on the basis of an output signal of the second light sensor arrangement and the output signal of the first light sensor arrangement. The illumination controller is arranged to control illumination on the basis of said amounts of daylight and artificial light.

15 Claims, 6 Drawing Sheets (51) Int. Cl.
 *G01J 1/42* (2006.01)
 *E06B 9/24* (2006.01)
(52) U.S. Cl.
 CPC .................. *G01J 2001/4247* (2013.01); *G01J 2001/4266* (2013.01); *Y02B 20/46* (2013.01)
(58) Field of Classification Search
 CPC ............ E06B 2009/6827; G01J 1/4204; G01J 2001/4266; G01J 2001/4247; Y02B 20/46
 See application file for complete search history.

(56) References Cited

U.S. PATENT DOCUMENTS

| | | |
|---|---|---|
| 2002/0060283 A1 | 5/2002 | Jordan et al. |
| 2011/0282468 A1* | 11/2011 | Ashdown ............... H05B 37/02 700/90 |
| 2013/0038224 A1* | 2/2013 | Bishop ................... G08C 23/04 315/153 |
| 2014/0209254 A1* | 7/2014 | Birru ...................... G05D 25/02 160/5 |
| 2014/0318717 A1* | 10/2014 | Patel .................. H05B 37/0218 160/5 |
| 2014/0375221 A1* | 12/2014 | Mans ................. H05B 33/0854 315/158 |
| 2015/0076992 A1* | 3/2015 | Walma ............... H05B 37/0218 315/153 |
| 2015/0154404 A1* | 6/2015 | Patel .................. H05B 37/0254 726/26 |
| 2015/0237703 A1* | 8/2015 | Patel .................. H05B 37/0227 315/151 |

FOREIGN PATENT DOCUMENTS

| | | |
|---|---|---|
| WO | 2010128767 A2 | 11/2010 |
| WO | 2012029004 A1 | 3/2012 |
| WO | 2012140545 A1 | 10/2012 |
| WO | 2013014564 A1 | 1/2013 |

\* cited by examiner

ILLUMINATION CONTROLLER

CROSS-REFERENCE TO PRIOR APPLICATIONS

This application is the U.S. National Phase application under 35 U.S.C. §371 of International Application No. PCT/IB2014/063800, filed on Aug. 8, 2014, which claims the benefit of U.S. Provisional Patent Application No. 61/988,334, filed on May 5, 2014 and European Patent Application No. 13180551.7, filed on Aug. 15, 2013. These applications are hereby incorporated by reference herein.

FIELD OF THE INVENTION

The present invention relates to an illumination controller.

BACKGROUND OF THE INVENTION

Today, there is lighting control for indoor lighting devices performed by means of an illumination controller which detects the level of light in the premises and controls the light output level of a set of lighting devices accordingly, wherein the light output level of the set of lighting devices is set in dependence of the detected level of the illumination. The purpose is to save energy by minimizing the level of illumination provided by the controlled lighting device while still obtaining a desired total illumination within the area which is covered by the set of, i.e. one or more, lighting devices. However, it would be advantageous to be able to discriminate the detected light in daylight and artificial light in a simple way.

SUMMARY OF THE INVENTION

It would be advantageous to provide a solution for determining the contribution of daylight to the total illumination.

Figure 8:
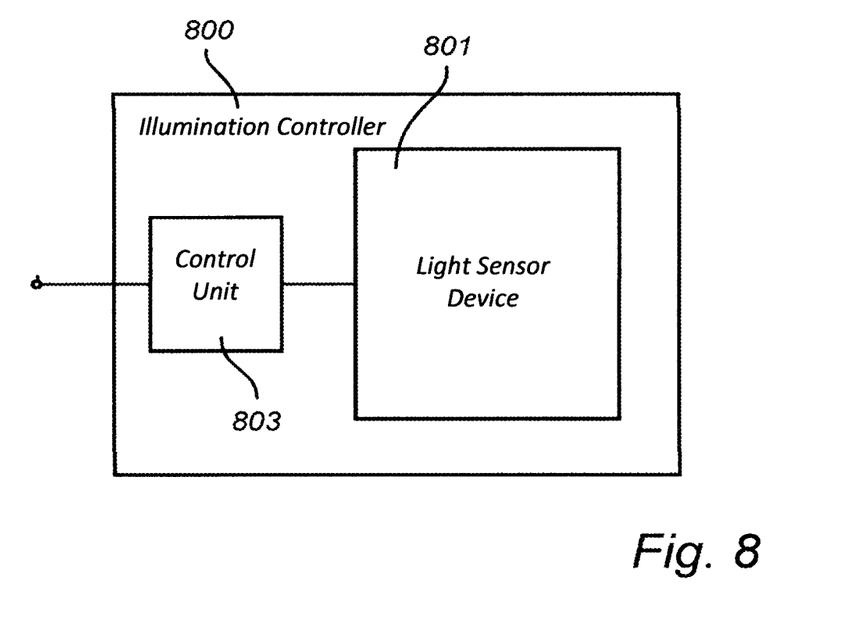
FIG. 8 is a block diagram of a basic embodiment of the illumination controller according to the present invention.

To better address this concern, in a first aspect of the invention there is presented an illumination controller 800, illustrated in FIG. 8, comprising:
- a light sensor device 801 comprising a first light sensor arrangement configured to sense light within a first spectral range including non-visible light and excluding a sub-range constituted by at least a major part of the visible light, and a second light sensor arrangement configured to sense light within a second spectral range including at least a part of said sub-range;
- a control unit 803 connected with the light sensor device and arranged to determine an amount of daylight on the basis of an output signal of the first light sensor arrangement and a function, which characterizes the relationship between the spectral power distribution of the infrared spectrum of daylight and the spectral power distribution of the visible spectrum of daylight, and to determine an amount of artificial light on the basis of an output signal of the second light sensor arrangement and the amount of daylight; and
- wherein the illumination controller is arranged to control illumination on the basis of said amounts of daylight and artificial light.

The operation of the illumination controller uses the condition that modern light sources emit no or very low amounts of non-visible light compared to the amount of non-visible light that is present in daylight. Furthermore, the relation between non-visible light and visible light in daylight has been predetermined and is predefined as a function. Thus, the first light sensor arrangement only or mainly detects the non-visible light, which only or at least to a great part originates from daylight. The second light sensor arrangement configured to sense light within a second spectral range including at least a part of said sub-range, wherein the control unit is arranged to discriminate between the daylight and the artificial light received by the light sensor device on the basis of the output signal of the second light sensor arrangement, the output signal of the first light sensor arrangement, and the predetermined function.

According to an embodiment of the illumination controller, the light sensor device comprises a full range photocell, which is sensitive to both non-visible light and visible light, and a filter device, which is arranged in front of the photocell, and which is switchable between at least two different spectral modes, comprising a first spectral mode where the filter is passing light within said first spectral range, and a second spectral mode, where the filter is passing light within said second spectral range. Thereby, a flexible and compact solution has been obtained.

According to an embodiment of the illumination controller, the filter is configurable for different spectral modes related to different light sources emitting light of different spectra, in order to separate the contributions from the different light sources.

According to an embodiment of the illumination controller, the switchable filter comprises an optical element, which is configured to polarize the passing light. Thereby the sensor device can be tailored for the polarization characteristics of light from different kinds of light sources. The polarization can be fixed after being initially set, or it can be adjustable.

According to an embodiment of the illumination controller, temporal switching characteristics of the optical element have been optimized for known temporal modulation of surrounding light sources the light of which is sensed by the photocell. Thereby it is possible to adapt the illumination controller to temporal modulation of nearby light sources, the light of which is sensed by the light sensor device.

According to an embodiment of the illumination controller, the first light sensor arrangement comprises a first photocell, sensitive to merely non-visible light, and the second light sensor arrangement comprises a second photocell, sensible to merely visible light. This is an alternative to using the above combination of a photocell and a filter.

According to an embodiment of the illumination controller, the first light sensor arrangement is configured to sense merely infrared light. In modern light sources the infrared part is zero or small relative to the infrared part in daylight. Therefore, the output of the infrared light sensor can be regarded as associated with the daylight.

According to another aspect of the invention, there is provided a lighting device, which comprises a light source, and the above-mentioned illumination controller.

According to another aspect of the invention, there is provided an apparatus for controlling the lighting of an environment on the basis of contributions to a total illumination from both daylight and artificial light, comprising the above-mentioned illumination controller.

According to another aspect of the invention, there is provided a data logger for estimating an energy savings potential, which comprises the above-mentioned illumination controller.

According to another aspect of the invention, there is provided a method of determining contributions from daylight and artificial light to a total illumination, comprising a preparation part and an operation part, which is repeated during operation, the preparation part comprising:

measuring a spectral power distribution of an infrared spectrum of daylight by means of a first light sensor arrangement;

measuring a spectral power distribution of a visible spectrum of daylight by means of a second light sensor arrangement; and determining a function which characterizes the relationship between the spectral power distribution of the infrared spectrum of daylight and the spectral power distribution of the visible spectrum of daylight;

The operation part comprises:

measuring a first factor as the spectral power distribution of an infrared spectrum of mixed light, containing daylight and artificial light, by means of the first light sensor arrangement;

measuring a second factor as the spectral power distribution of a visible spectrum of the mixed light by means of the second light sensor arrangement;

determining a daylight part of the second factor by applying the function on the first factor;

determining an artificial light part of the second factor as the difference between the second factor and the daylight part thereof;

determining the daylight illuminance by means of the daylight part; and determining the artificial light illuminance by means of the artificial light part.

BRIEF DESCRIPTION OF THE DRAWINGS

The invention will now be described in more detail and with reference to the appended drawings in which.

DESCRIPTION OF EMBODIMENTS

Figure 1:
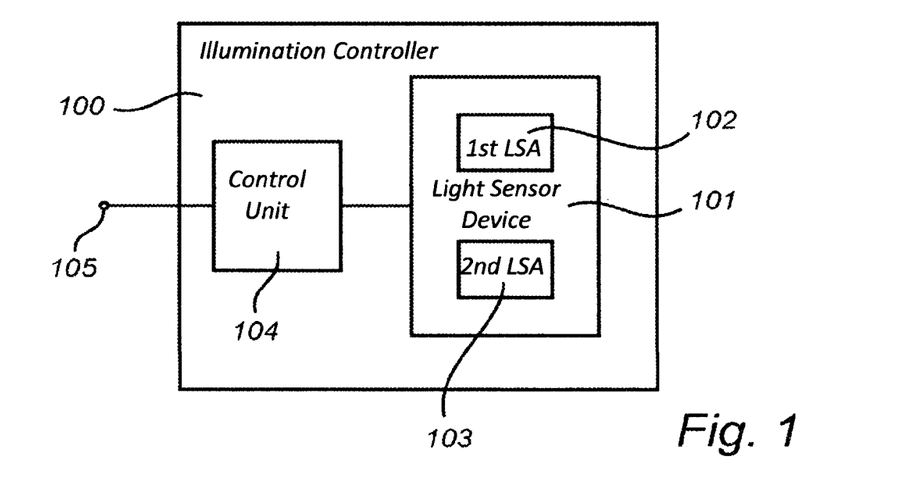
FIG. 1 is a block diagram of an embodiment of the illumination controller according to the present invention.
Figure 3:
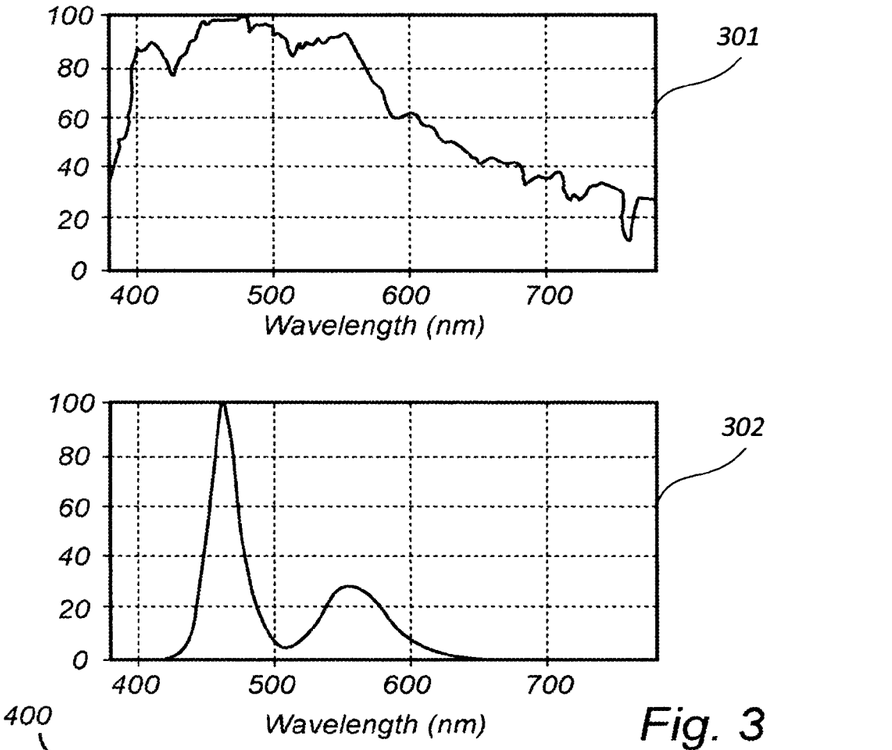
FIG. 3 is a diagram showing typical daylight and artificial light spectra.
Figure 9:
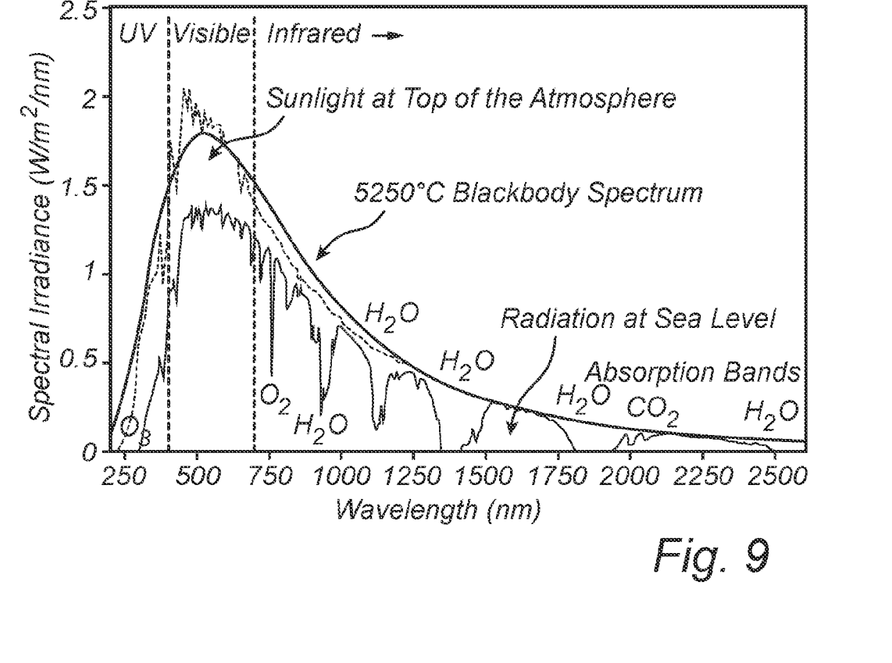
FIG. 9 is a graph illustrating the spectral distribution of daylight.

According to an embodiment, illustrated in FIG. 1, of the illumination controller 100, it comprises a light sensor device 101, a first light sensor arrangement (1st LSA) 102, a second light sensor arrangement (2nd LSA) 103, and a control unit 104. The first light sensor arrangement 102 is configured to sense light within a first spectral range including non-visible light and excluding at least a sub-range constituted by a major part of the visible light. The second light sensor arrangement 103 is configured to sense light within a second spectral range including at least a part of said sub-range. Modern artificial light sources, e.g. LED (Light Emitting Diode) based light sources, are designed to have a light spectrum that is focused on visible light, i.e. wavelengths which are perceptible for the human eye, and emits none or little non-visible light relative to the amount of visible light emitted. To the contrary, natural light, i.e. daylight, contains a relatively large amount of non-visible light, in particular infrared light. This is exemplified in FIG. 3, where the top graph represents the relative spectral distribution of daylight, and the bottom graph represents the relative spectral distribution of a white LED. Generally, wavelengths in the range of approximately 700 nm to 1 mm are defined as infrared light, and wavelengths in the range of approximately 100 nm to 400 nm are defined as ultraviolet light. Consequently, by differentiating the light sensor arrangements 102, 103 as defined above, the first light sensor arrangement 102 is primarily detecting (non-visible) daylight, and the output thereof is used to determine the total amount of daylight. The second light sensor arrangement 103 senses also other light sources, i.e. artificial lighting, if present, and by comparing the outputs of the first and second light sensor arrangements 102, 103 the control unit 104 is able to determine the relation between daylight and artificial light. The control unit provides the result at an output terminal 105 of the illumination controller 100. Generally defined, the first light sensor arrangement 102 is configured to sense light within a first spectral range including non-visible light and excluding a sub-range constituted by at least a major part of the visible light, and the second light sensor arrangement 103 is configured to sense light within a second spectral range including at least a part of said sub-range. For instance, the first spectral range can be the infrared spectrum, wherein the sub-range is the whole range of visible light and the range of ultraviolet light. The second spectral range can be the full range of both visible and non-visible light. The relation between the amount of infrared light and visible light in daylight is known, as shown in FIG. 9, which illustrates the spectral distribution of daylight at different levels of the atmosphere, and can be predefined as a function, which characterizes the relationship between the spectral power distribution of the infrared spectrum of daylight and the spectral power distribution of the visible spectrum of daylight. Furthermore, the wavelength content of artificial light sources can be approximated with only visible wavelengths. Thereby, it is possible for the control unit 104 to determine the amount of daylight and the amount of artificial light that is sensed by the light sensing device 101, and to give corresponding control information to an apparatus, which is connected with the illumination controller 100, and examples of which will be given below. As an alternative or as an additional option, the light sensor arrangements 102, 103 can be calibrated, as a commissioning operation, for no daylight and maximum daylight, etc.

Many other combinations of first and second spectral ranges are feasible, such as only infrared light and only visible light or merely a part of the visible range; only ultraviolet light and only visible light; etc., but one of the spectral ranges should be focused on a range of non-visible wavelengths, in order to serve as a basis for estimating the amount of daylight present, which may of course range from no daylight to maximum sunlight.

Figure 2:
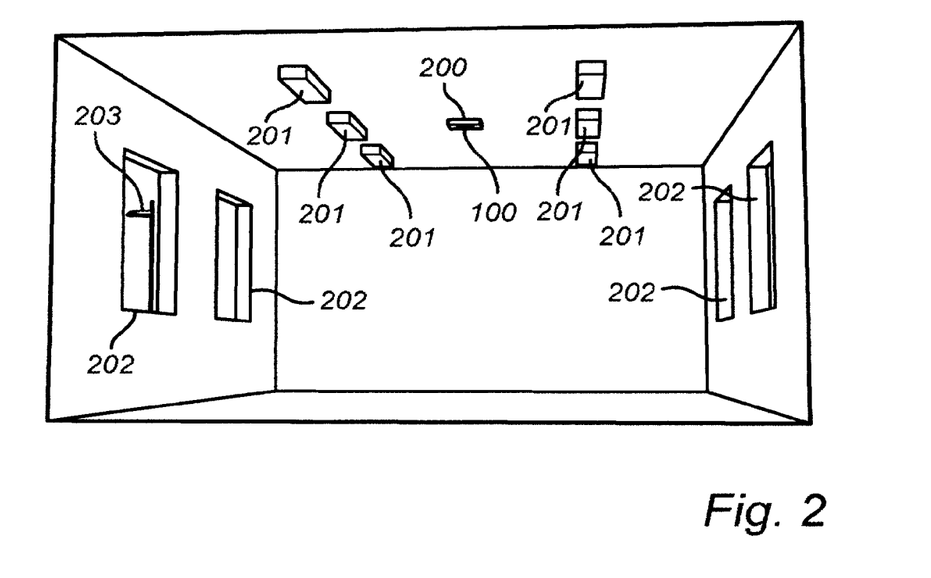
FIG. 2 illustrates an example of an environment where the illumination controller is used.

An exemplifying situation is shown in FIG. 2, where the illumination controller 100 is comprised in, or constitutes, an apparatus 200 arranged in an environment, here exemplified by a room, for controlling the illumination of the room, and connected with a set of lighting devices 201, here containing several luminaires 201 for illuminating the room, or at least important parts thereof, such as work stations or desks. In the FIG. 2, the apparatus 200 is shown as a separate device, but as an alternative it can be integrated with a luminaire 201. The illumination controller 100 detects illumination caused by both the luminaires 201 of the room and by daylight entering the room through windows 202. There may also be other artificial lighting devices 203 outside of the room contributing to the illumination of the room at times. Prior art systems for controlling the light output levels of luminaires by only measuring the total illumination suffer from different sensitivity of the photo-sensor to daylight and artificial light. That causes non-optimal settings of the luminaires when the daylight contribution to the total illumination differs. Since the illumination controller 100 is able to separately determine the respective contribution from daylight and artificial light to the total illumination, it is able to set the light output levels of the luminaires 201 more accurately and more optimal for different daylight conditions. The apparatus 200 can be a so called daylight harvesting lighting control system.

Figure 10:
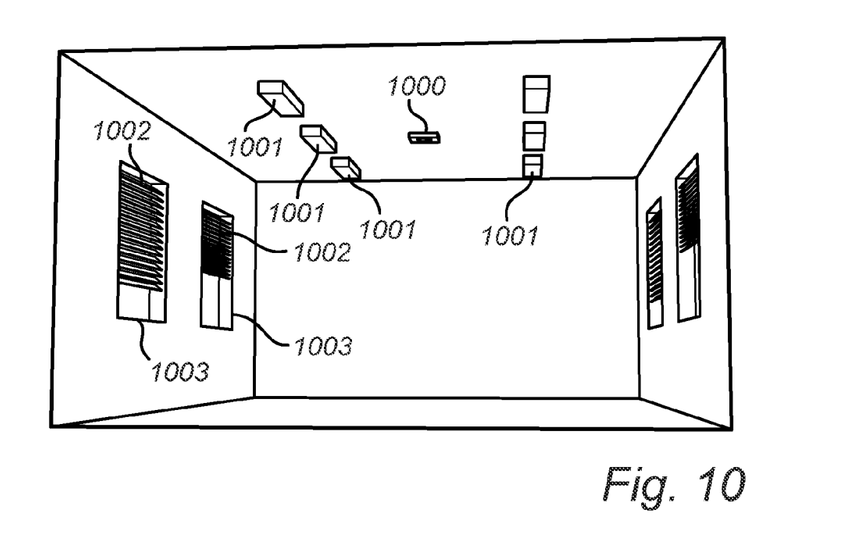
FIGS. 10 and 11 show different applications of the illumination controller.

As a further embodiment, as shown in FIG. 10, an apparatus 1000 for controlling the illumination of an environment, such as a room, is similar to the apparatus shown in FIG. 2, but the apparatus 1000, in addition to being connected with a set of lighting devices 1001 of the room, is also connected with electrically operable window blinds 1002 at the windows 1003 for controlling the setting of the blinds as well. Preferably, the apparatus 1000 is arranged to increase an illuminance of the room by primarily controlling the blinds 1002 and secondarily controlling the set of lighting devices 1001. Thereby, the daylight is used to a maximum, optimizing the energy efficiency of the lighting system.

Furthermore, the illumination controller 100 is applicable to a data logger for estimating an energy savings potential, the data logger being arranged to detect sudden changes of illuminance in an environment. By means of the separated detection of daylight and artificial light performed by the illumination controller 100, the data logger is capable of determining if a sudden change of illuminance is caused by a change of daylight or artificial light by means of the illumination controller. Thereby, for instance, a sudden decrease of illumination occurring when a fast moving cloud hides the sun will be correctly interpreted instead of being interpreted as the artificial light being switched off.

Figure 11:
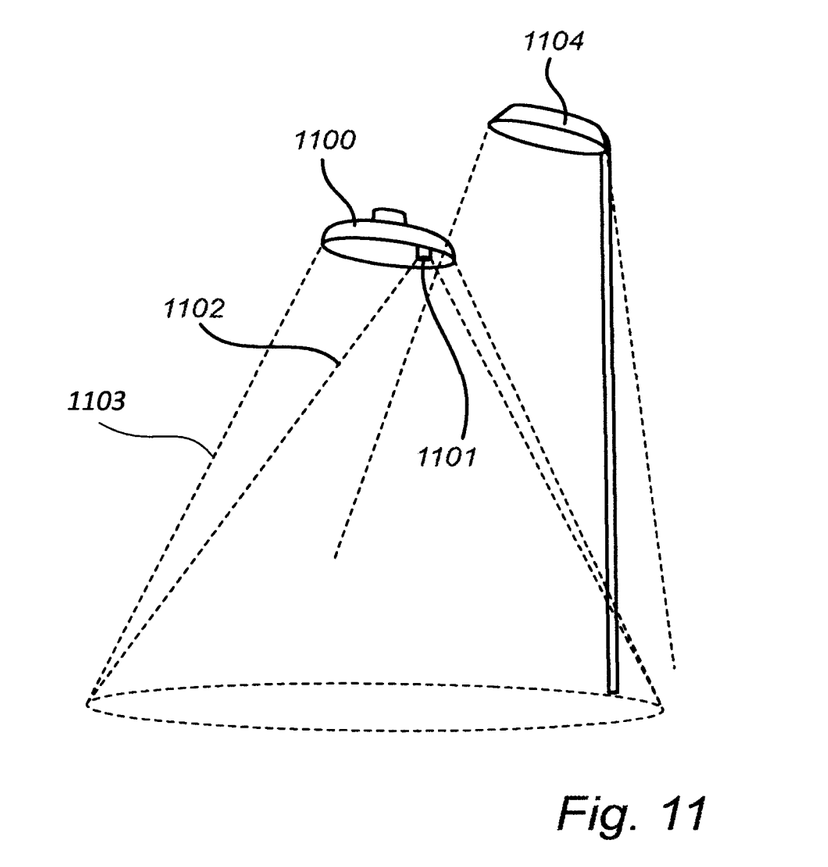

According to an embodiment of a lighting device 1100, as shown in FIG. 11, the illumination controller 1101 is integrated with the lighting device 1100, or mounted at some other position at the lighting device 1100, and is arranged to control the light output of that single lighting device 1100. The field of view (FoV) 1102 of the illumination controller 1101 has been matched with the footprint 1103 of the light source comprised in the lighting device 1100. It is advantageous for the accuracy of the measurements that the field of view of the illumination controller 1101 at least substantially coincides with the area illuminated by the lighting device 1100. However, there may be several sources which contribute to the total illumination within the field of view 1102 of the illumination controller 1101 at different times of day and year, such as daylight, and neighboring artificial light sources 1104. The illumination controller 1101 is typically used for controlling the light output of the light source 1102 taking all other contributing illumination into account. With the detailed knowledge about the relation between daylight and artificial light, the control is improved relative to prior art light source control.

Figure 4:
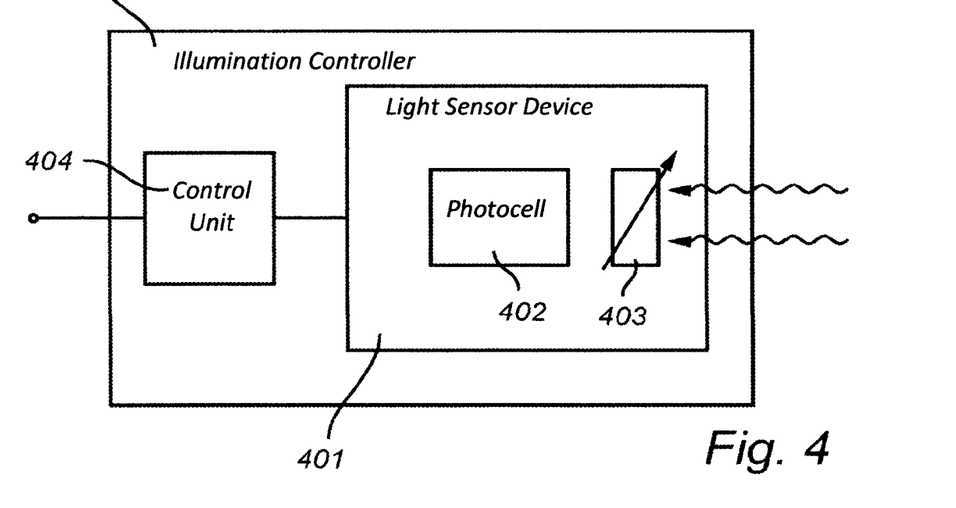
FIGS. 4, 5 and 6 are block diagrams showing further embodiments of the illumination controller according to the present invention.

According to an embodiment of the illumination controller 400, as shown in FIG. 4, it comprises a light sensor device 401, which includes a photocell 402 and a switchable filter 403, arranged in front of the photocell 402. The illumination controller 400 further comprises a control unit 404 connected with the light sensor device 401, and an output terminal 405 connected with the control unit 404. The photocell 402 is a full range photocell, i.e. it is sensitive to both non-visible and visible light. In this embodiment the photocell 402 and the switchable filter 403 in conjunction implements the first and second light sensor arrangements 102, 103 described above. The filter 403 is switchable between at least two different spectral modes. In a first spectral mode, the filter 403 configured to pass light in accordance with the first spectral range mentioned above, and in a second spectral mode, the filter 403 is configured to pass light in accordance with the second spectral range mentioned above.

When there are neighboring light sources providing illumination within the field of view of the illumination controller 400, where neighboring light sources emit light with different spectra, according to a further embodiment, the switchable filter 403 is configurable for different spectral modes matching those different spectra. Thereby, it is possible to separate the contributions from the different light sources, and to control a light source to which the illumination controller 400 is connected on the basis thereof. For instance, it can be desirable to obtain a particular total illumination level, a particular color temperature, etc.

Figure 5:
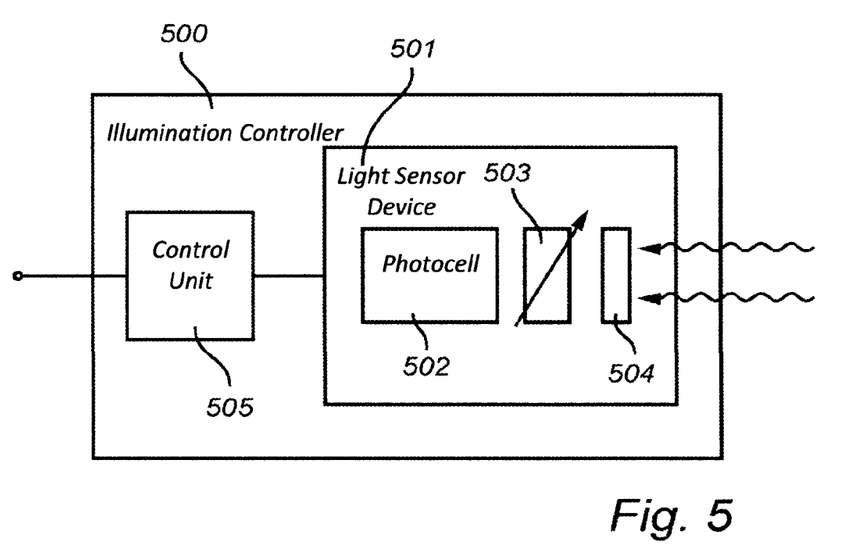

In accordance with a further embodiment of the illumination controller 500, as shown in FIG. 5, it comprises a light sensor device 501, and a control unit 505 connected with the light sensor device 501. The light sensor device 501 comprises a photocell 502, a switchable filter 503 arranged in front of the photocell 502, and an optical element 504 arranged in front of the filter 503. The optical element has adjustable polarization characteristics. By adjusting the optical element 504 it can be matched with the polarization characteristics of daylight or light from different kinds of light sources. As an option, the optical element 504 has a fixed polarization characteristic, or it is initially set and then not changed.

The optical element 504 can be provided with the additional function of temporal switching in order to align its temporal switching characteristics with temporal modulation of surrounding light sources. This is another or an additional way of separating one light source from another one. A similar effect is obtainable by sampling the above-mentioned photocell accordingly.

Figure 6:
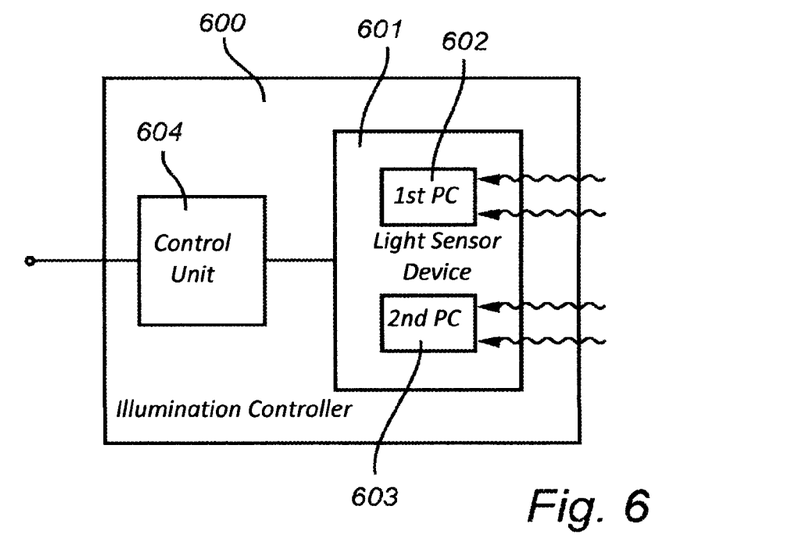

According to yet another embodiment of the illumination controller 600, as shown in FIG. 6, it comprises a light sensor device 601 and a control unit 604. The light sensor device 601 comprises a first and a second photocell 602, 603. The first photocell (1st PC) 602 is sensitive to merely non-visible light, and the second photocell (2nd PC) 603 is sensitive to merely visible light.

Figure 7:
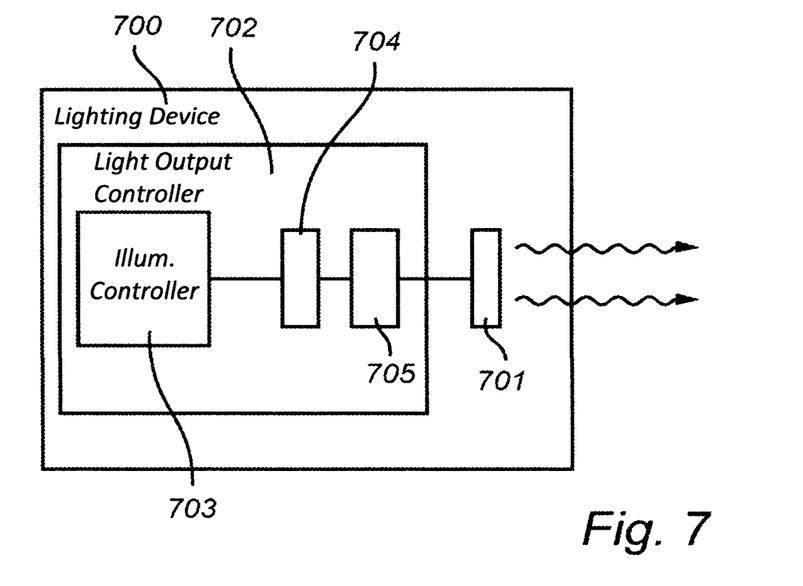
FIG. 7 is a block diagram of an illumination device comprising the illumination controller.

As shown in FIG. 7, the illumination controller is advantageously used at a lighting device 700, which comprises at least one light source 701, such as a LED, and a light output controller 702, which comprises the illumination controller (Illum. Controller) 703, a light source controller 704 connected with the illumination controller 703, and a drive unit 705 connected with the light source controller 704 and with the light source 701 for controlling the light output of said at least one light source 701, and thus of the lighting device 700. Thus, the illumination controller 703 sets the output signal level of the drive unit 705.

An embodiment of the method of determining contributions from daylight and artificial light to a total illumination comprises a preparation part and an operation part. The method is performed by the illumination controller. However, the preparation part also involves other devices and user action.

As mentioned above, the visible portion of the daylight spectrum can be approximated using IR spectrum measurements, due to the proportional relationship between them. What is actually measured, according to this embodiment is the Spectral Power Distribution (SPD), which describes the power per unit area per unit wavelength of an illumination (radiant exitance). In order to ensure the accuracy of the measurements, in the preparation part, the SPD of an infrared spectrum of daylight I(λ) is measured by means of the first light sensing arrangement, according to any one of the above embodiments, and the SPD of a visible spectrum of daylight S(λ) is measured by means of the second light sensor arrangement. Then a function, which characterizes the relationship between the SPD of the infrared spectrum of daylight and the SPD of the visible spectrum of daylight, is determined as:

$$S(\lambda) = F(I(\lambda)) \quad \text{eqn. 1}$$

The above function approximates the SPD of visible portion of daylight given the SPD of the IR portion of the daylight. The function F is derived based on known mathematical techniques such as regression analysis. The function F may be specific for a family of IR sensors. For different type of IR sensors the function F may be different. Once the relationship has been characterized, it can be put to use as explained in below.

The operation part comprises the following operations. The SPD of daylight and artificial light have to be disaggregated from the total, mixed, light. This is done by measuring a first factor as the SPD of an IR spectrum of mixed light I(λ) by means of the first light sensor arrangement, and measuring a second factor as the SPD of a visible spectrum of mixed light M(λ) by means of the second light sensor arrangement. Then the SPD of the visible spectrum of daylight is determined using eqn. 1 applied to the first factor, i.e. S(λ)=F(I(λ)).

The SPD of the visible spectrum of the artificial light, denoted as A(λ), is then determined as the second factor minus the SPD of the visible daylight, i.e.:

$$A(\lambda) = M(\lambda) - F(I(\lambda)) \quad \text{eqn. 2}$$

The daylight illuminance $I_d$ is determined by means of the SPD of the visible spectrum S(λ) according to:

$$I_d = 683 \int V(\lambda) S(\lambda) d\lambda$$

The artificial light illuminance $I_a$ is determined by means of the SPD of the artificial light A(λ) according to:

$$I_a = 683 \int V(\lambda) A(\lambda) d\lambda$$

V(λ) is the spectral luminous efficiency function standardized by CIE, and also known as eye sensitivity function.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored or distributed on a suitable medium, such as an optical storage medium or a solid-state medium supplied together with or as part of other hardware, but may also be distributed in other forms such as via the Internet or other wired or wireless telecommunication systems. Any reference signs in the claims should not be construed as limiting the scope.

The invention claimed is:

1. An illumination controller comprising:
    a light sensor device comprising a first light sensor arrangement configured to sense light within a first spectral range including non-visible light and excluding a sub-range constituted by at least a part of the visible light, and a second light sensor arrangement configured to sense light within a second spectral range including at least a part of said sub-range;
    a control unit connected with the light sensor device and arranged to determine an amount of daylight based on an output signal of the first light sensor arrangement and a predetermined function, which characterizes the relationship between the spectral power distribution of the infrared spectrum of daylight and the spectral power distribution of the visible spectrum of daylight, and to determine an amount of artificial light based on a comparison of an output signal of the second light sensor arrangement and the output signal of the first light sensor arrangement; and
    wherein the illumination controller is arranged to control illumination based on said comparison of amounts of daylight and artificial light.

2. The illumination controller according to claim 1, wherein the light sensor device comprises a photocell, which is sensitive to both non-visible light and visible light, and a filter device, which is arranged in front of the photocell, and which is switchable between at least two different spectral modes, comprising a first spectral mode where the filter is passing light within said first spectral range, and a second spectral mode, where the filter is passing light within said second spectral range.

3. The illumination controller according to claim 2, wherein the filter is configurable for different spectral modes related to different light sources emitting light of different spectra, in order to separate the contributions from the different light sources.

4. The illumination controller according to claim 2, wherein the switchable filter comprises an optical element, which is configured to polarize the passing light of at least one of said first spectral range or said second spectral range.

5. The illumination controller according to claim 4, wherein temporal switching characteristics of the optical element have been optimized for known temporal modulation of surrounding light sources, the light of which is sensed by the photocell.

6. The illumination controller according to claim 1, wherein the first light sensor arrangement comprises a first photocell, sensitive to merely non-visible light, and the second light sensor arrangement comprises a second photocell, sensible to merely visible light.

7. The illumination controller according to claim 1, wherein the first light sensor arrangement is configured to sense merely infrared light.

8. A lighting device comprising a light source and an illumination controller according to claim 1, which is connected with the light source for controlling a light output level of the light source.

9. The lighting device according to claim 8, wherein a field of view of the light sensor device is matched with a footprint of illumination of the light source.

10. An apparatus for controlling lighting of an environment based on contributions to a total illumination from both daylight and artificial light, comprising an illumination controller according to claim 1, wherein the apparatus is connectable with a set of lighting devices, including at least one lighting device, for controlling light output of the set of lighting devices.

11. The apparatus according to claim 10, wherein the apparatus is further connectable with window blinds for controlling a setting of the window blinds.

12. The apparatus according to claim 11, wherein the apparatus is arranged to increase an illuminance of the environment by primarily controlling the window blinds and secondarily controlling the set of lighting devices.

13. A data logger for estimating an energy savings potential, the data logger being arranged to detect sudden changes of illuminance in an environment, the data logger comprising an illumination controller according to claim 1, wherein the data logger is arranged to determine if a sudden change of illuminance is caused by a change of daylight or artificial light by employing the illumination controller.

14. A method of determining contributions to a total illumination, comprising a preparation part and an operation part, the preparation part comprising:

measuring a spectral power distribution of an infrared spectrum of daylight with a first light sensor arrangement;

measuring a spectral power distribution of a visible spectrum of daylight with a second light sensor arrangement; and determining a function which characterizes the relationship between the spectral power distribution of the infrared spectrum of daylight and the spectral power distribution of the visible spectrum of daylight; and the operation part comprising:

measuring a first factor as the spectral power distribution of an infrared spectrum of mixed light, containing daylight and artificial light, using the first light sensor arrangement;

measuring a second factor as the spectral power distribution of a visible spectrum of the mixed light using the second light sensor arrangement;

determining a daylight part of the second factor by applying the function on the first factor;

determining an artificial light part of the second factor as the difference between the second factor and the daylight part thereof;

determining the daylight illuminance based on the daylight part; and determining the artificial light illuminance based on the artificial light part.

15. The method according to claim 14, said determining the daylight illuminance comprising determining an integral of the daylight part and a standardized spectral luminous efficiency function; and said determining the artificial light illuminance comprising determining an integral of the artificial part and the standardized spectral luminous efficiency function.

* * * * *